United States Patent
Bauer et al.

(10) Patent No.: US 11,692,097 B2
(45) Date of Patent: Jul. 4, 2023

(54) FLAME-RETARDANT POLYAMIDE COMPOSITIONS WITH A HIGH GLOW WIRE IGNITION TEMPERATURE AND USE THEREOF

(71) Applicant: CLARIANT PLASTICS & COATINGS LTD, Muttenz (CH)

(72) Inventors: Harald Bauer, Kerpen (DE); Sebastian Hörold, Diedorf (DE); Martin Sicken, Cologne (DE)

(73) Assignee: Clariant International Ltd, Muttenz (CH)

( * ) Notice: Subject to any disclaimer, the term of this patent is extended or adjusted under 35 U.S.C. 154(b) by 127 days.

(21) Appl. No.: 16/637,815

(22) PCT Filed: Aug. 8, 2018

(86) PCT No.: PCT/EP2018/071445
§ 371 (c)(1),
(2) Date: Feb. 10, 2020

(87) PCT Pub. No.: WO2019/030252
PCT Pub. Date: Feb. 14, 2019

(65) Prior Publication Data
US 2021/0363349 A1  Nov. 25, 2021

(30) Foreign Application Priority Data
Aug. 11, 2017 (DE) ..................... 10 2017 214 048.8

(51) Int. Cl.
| | |
|---|---|
| *C08L 77/06* | (2006.01) |
| *C08G 69/26* | (2006.01) |
| *C08K 3/40* | (2006.01) |
| *C08K 5/52* | (2006.01) |
| *C08K 5/524* | (2006.01) |
| *C08K 5/5313* | (2006.01) |
| *C08K 5/5333* | (2006.01) |
| *C08K 7/14* | (2006.01) |
| *C08K 13/04* | (2006.01) |

(52) U.S. Cl.
CPC .............. *C08L 77/06* (2013.01); *C08G 69/26* (2013.01); *C08K 3/40* (2013.01); *C08K 5/524* (2013.01); *C08K 5/5205* (2013.01); *C08K 5/5313* (2013.01); *C08K 5/5333* (2013.01); *C08K 7/14* (2013.01); *C08K 13/04* (2013.01); *C08K 2201/014* (2013.01); *C08L 2201/02* (2013.01); *C08L 2205/025* (2013.01)

(58) Field of Classification Search
CPC .............. C08L 77/06; C08L 2201/02; C08L 2205/025; C08G 69/26; C08K 3/40; C08K 5/5205; C08K 5/524; C08K 5/5313; C08K 5/5333; C08K 7/14; C08K 13/04; C08K 2201/014
See application file for complete search history.

(56) References Cited

U.S. PATENT DOCUMENTS

| | | | |
|---|---|---|---|
| 3,900,444 A | 8/1975 | Racky et al. | |
| 4,036,811 A | 7/1977 | Noetzel et al. | |
| 5,773,556 A | 6/1998 | Kleiner et al. | |
| 6,207,736 B1 | 3/2001 | Nass et al. | |
| 6,509,401 B1 | 1/2003 | Jenewein et al. | |
| 7,420,007 B2 | 9/2008 | Bauer et al. | |
| 7,649,038 B2 | 1/2010 | Dieter-Naegerl et al. | |
| 8,754,154 B2 | 6/2014 | Dave et al. | |
| 10,421,909 B2 | 9/2019 | Bauer et al. | |
| 10,508,238 B2 | 12/2019 | Bauer et al. | |
| 2005/0004277 A1* | 1/2005 | Hoerold | C08K 5/02 524/99 |
| 2006/0074157 A1* | 4/2006 | Bauer | C07F 9/301 524/115 |
| 2006/0226404 A1* | 10/2006 | Bauer | C09K 21/12 252/601 |
| 2013/0190432 A1* | 7/2013 | Krause | C08K 5/52 524/101 |

(Continued)

FOREIGN PATENT DOCUMENTS

| | | |
|---|---|---|
| CN | 1660857 A | 8/2005 |
| CN | 103154110 A | 6/2013 |

(Continued)

OTHER PUBLICATIONS

Melapur 200 Data Sheet. BASF. Mar. 2012. (Year: 2012).*
Domininghaus in "Die Kunststoffe und ihre Eigenschaften", The Polymers and Their Properties 5th edition (1998), p. 14.
International Search Report (with partial translation) and Written Opinion issued in correpsonding International Patent Application No. PCT/EP2018/071445, dated Nov. 19, 2018.
First Office Action (OA1) issued in corresponding Chinese Patent Application No. 201810143505.1, dated Jul. 1, 2020.
Second Office Action issued in corresponding Chinese Patent Application No. 201810143505.1, dated Apr. 2, 2021.
Office Action (IN OA) issued in corresponding Indian Patent Application No. 202017002635, dated Aug. 2, 2021.
Office Action issued in corresponding German Patent Application No. 102017214048.8, dated Oct. 12, 2017.

(Continued)

*Primary Examiner* — John E Uselding
(74) *Attorney, Agent, or Firm* — Morgan, Lewis & Bockius LLP

(57) ABSTRACT

A flame-retardant polyamide composition can be prepared with a glow wire ignition temperature of not less than 775° C. Such a composition can include a polyamide having a melting point of not more than 290° C. as component A, fillers and/or reinforcers as component B, a phosphinic salt of the formula (I) as component C, a compound selected from the group of the Al, Fe, $TiO_p$ and Zn salts of ethylbutylphosphinic acid, of dibutylphosphinic acid, of ethylhexylphosphinic acid, of butylhexylphosphinic acid and/or of dihexylphosphinic acid as component D, a phosphonic salt of the formula (II) as component E, and a melamine polyphosphate having an average degree of condensation of 2 to 200 as component F. Additional components can be included in the composition.

13 Claims, No Drawings

(56) References Cited

U.S. PATENT DOCUMENTS

| | | | |
|---|---|---|---|
| 2016/0009918 A1 | 1/2016 | Hoerold et al. | |
| 2016/0264774 A1 | 9/2016 | Bienmueller et al. | |
| 2020/0165416 A1 | 5/2020 | Bauer et al. | |

FOREIGN PATENT DOCUMENTS

| | | |
|---|---|---|
| CN | 105940085 A | 9/2016 |
| DE | 2252258 A1 | 5/1974 |
| DE | 2447727 A1 | 4/1976 |
| DE | 19607635 A1 | 9/1997 |
| DE | 19734437 A1 | 2/1999 |
| DE | 19737727 A1 | 7/1999 |
| DE | 10359814 A1 | 7/2005 |
| DE | 102005016195 A1 | 10/2006 |
| DE | 102007036465 A | 2/2009 |
| DE | 102011120218 A1 | 6/2013 |
| DE | 102014001222 A1 | 7/2015 |
| EP | 1544206 A1 | 6/2005 |
| EP | 1095030 B1 | 8/2007 |
| EP | 3133112 A1 | 2/2017 |
| EP | 3652245 A1 | 5/2020 |
| EP | 3214118 B1 | 10/2020 |
| JP | 2004-204194 A | 7/2004 |
| KR | 10-2013-0132432 A | 12/2013 |
| WO | 2000/002869 A1 | 1/2000 |
| WO | 2002/28953 A1 | 4/2002 |
| WO | 2006/027340 A1 | 3/2006 |
| WO | 2012/045414 A1 | 4/2012 |
| WO | 2014/135256 A1 | 9/2014 |
| WO | 2016/065971 A1 | 5/2016 |
| WO | 2018/050498 A1 | 3/2018 |
| WO | 2019/011792 A1 | 1/2019 |

OTHER PUBLICATIONS

Office Action dated Dec. 23, 2021, issued in corresponding Taiwan Patent Application No. 107124909.

Office Action dated May 4, 2022, issued in corresponding European Patent Application No. 18752741.1.

* cited by examiner

FLAME-RETARDANT POLYAMIDE COMPOSITIONS WITH A HIGH GLOW WIRE IGNITION TEMPERATURE AND USE THEREOF

The present invention relates to flame-retardant polyamide compositions and to moldings produced therefrom which feature a high glow wire ignition temperature (GWIT value).

Combustible plastics generally have to be equipped with flame retardants in order to be able to attain the high flame retardancy demands made by the plastics processors and in some cases by the legislator. Preferably—for environmental reasons as well—nonhalogenated flame retardant systems that form only a low level of smoke gases, if any, are used.

Among these flame retardants, the salts of phosphinic acid (phosphinates) have been found to be particularly effective for thermoplastic polymers (DE 2252258 A and DE 2447727 A).

In addition, there are known synergistic combinations of phosphinates with particular nitrogen-containing compounds which have been found to be more effective as flame retardants in a whole series of polymers than the phosphinates alone (WO-2002/28953 A1, and also DE 19734437 A1 and DE 19737727 A1).

U.S. Pat. No. 7,420,007 B2 discloses that dialkylphosphinates containing a small amount of selected telomers as flame retardant are suitable for polymers, the polymer being subject only to quite a minor degree of degradation on incorporation of the flame retardant into the polymer matrix.

Flame retardants frequently have to be added in high dosages in order to ensure sufficient flame retardancy of the polymer according to international standards. Due to their chemical reactivity, which is required for flame retardancy at high temperatures, flame retardants, particularly at higher dosages, can impair the processing stability of plastics. This may result in increased polymer degradation, crosslinking reactions, outgassing or discoloration.

WO 2014/135256 A1 discloses polyamide molding compounds having distinctly improved thermal stability, reduced tendency to migration and good electrical and mechanical properties.

However, there has to date been a lack of flame-retardant phosphinate-containing polyamide compositions that achieve all the properties required simultaneously, in this case good electrical values and effective flame retardancy.

It was therefore an object of the present invention to provide flame-retardant polyamide compositions based on phosphinate-containing flame retardant systems which have all the aforementioned properties at the same time and which especially good electrical values (high glow wire ignition temperatures GWIT, GWFI and CTI) and effective flame retardancy (UL-94), characterized by minimum afterflame times (time).

The invention provides flame-retardant polyamide compositions with a glow wire ignition temperature of not less than 775° C., comprising polyamide having a melting point of not more than 290° C., preferably of not more than 280° C. and most preferably of not more than 250° C., as component A, fillers and/or reinforcers, preferably glass fibers, as component B, phosphinic salt of the formula (I) as component C

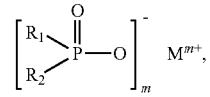

in which $R_1$ and $R_2$ are ethyl,
M is Al, Fe, $TiO_p$ or Zn,
m is 2 to 3, preferably 2 or 3, and $p=(4-m)/2$ compound selected from the group of the Al, Fe, $TiO_p$ and Zn salts of ethylbutylphosphinic acid, of dibutylphosphinic acid, of ethylhexylphosphinic acid, of butylhexylphosphinic acid and/or of dihexylphosphinic acid as component D phosphonic salt of the formula (II) as component E

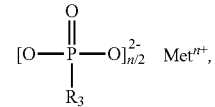

in which $R_3$ is ethyl,
Met is Al, Fe, $TiO_q$ or Zn,
n is 2 to 3, preferably 2 or 3, and $q=(4-n)/2$, and melamine polyphosphate having an average degree of condensation of 2 to 200 as component F.

In the polyamide composition of the invention, the proportion of component A is typically 25% to 95% by weight, preferably 25% to 75% by weight.

In the polyamide composition of the invention, the proportion of component B is typically 1% to 45% by weight, preferably 20% to 40% by weight.

In the polyamide composition of the invention, the proportion of component C is typically 1% to 35% by weight, preferably 5% to 20% by weight.

In the polyamide composition of the invention, the proportion of component D is typically 0.01% to 3% by weight, preferably 0.05% to 1.5% by weight.

In the polyamide composition of the invention, the proportion of component E is typically 0.001% to 1% by weight, preferably 0.01% to 0.6% by weight.

In the polyamide composition of the invention, the proportion of component F is typically 1% to 25% by weight, preferably 2% to 10% by weight.

These percentages for the proportions of components A to F are based on the total amount of the polyamide composition.

Preference is given to flame-retardant polyamide compositions in which
the proportion of component A is 25% to 95% by weight,
the proportion of component B is 1% to 45% by weight,
the proportion of component C is 1% to 35% by weight,
the proportion of component D is 0.01% to 3% by weight,
the proportion of component E is 0.001% to 1% by weight, and
the proportion of component F is 1% to 25% by weight,
where the percentages are based on the total amount of the polyamide composition.

Particular preference is given to flame-retardant polyamide compositions in which
the proportion of component A is 25% to 75% by weight,
the proportion of component B is 20% to 40% by weight,
the proportion of component C is 5% to 20% by weight,
the proportion of component D is 0.05% to 1.5% by weight,
the proportion of component E is 0.01% to 0.6% by weight, and
the proportion of component F is 2% to 10% by weight.

Salts of component C that are used with preference are those in which $M^{m+}$ is $Zn^{2+}$, $Fe^{3+}$ or especially $Al^{3+}$.

Salts of component D that are used with preference are zinc, iron or especially aluminum salts.

Salts of component E that are used with preference are those in which Met is $Zn^{2+}$, $Fe^{3+}$ or especially $Al^{3+}$.

Very particular preference is given to flame-retardant polyamide compositions in which M and Met are Al, m and n are 3, and in which the compounds of component D take the form of aluminum salts.

In a preferred embodiment, the above-described flame-retardant polyamide compositions comprise an inorganic phosphonate as a further component G.

The use of the inorganic phosphonates used in accordance with the invention as component G or else of salts of phosphorous acid (phosphites) as flame retardants is known. For instance, WO 2012/045414 A1 discloses flame retardant combinations comprising, as well as phosphinic salts, also salts of phosphorous acid (=phosphites).

Preferably, the inorganic phosphonate (component G) conforms to the formula (IV) or (V)

$$[(HO)PO_2]^{2-}{}_{p/2} Kat^{p+} \quad (IV)$$

$$[(HO)_2PO]^{-}{}_p Kat^{p+} \quad (V)$$

in which Kat is a p-valent cation, especially a cation of an alkali metal or alkaline earth metal, an ammonium cation and/or a cation of Fe, Zn or especially of Al, including the cations Al(OH) or Al(OH)$_2$, and p is 1, 2, 3 or 4.

Preferably, the inorganic phosphonate (component G) is aluminum phosphite [Al(H$_2$PO$_3$)$_3$], secondary aluminum phosphite [Al$_2$(HPO$_3$)$_3$], basic aluminum phosphite [Al(OH)(H$_2$PO$_3$)$_2$*2aq], aluminum phosphite tetrahydrate [Al$_2$(HPO$_3$)$_3$*4aq], aluminum phosphonate, Al$_7$(HPO$_3$)$_9$(OH)$_6$(1,6-hexanediamine)$_{1.5}$*12H$_2$O, Al$_2$(HPO$_3$)$^3$*xAl$_2$O$_3$*nH$_2$O where x=2.27-1 and/or Al$_4$H$_6$P$_{16}$O$_{18}$.

The inorganic phosphonate (component G) preferably also comprises aluminum phosphites of the formulae (VI), (VII) and/or (VIII)

$$Al_2(HPO_3)_3 x(H_2O)_q \quad (VI)$$

where q is 0 to 4, $$Al_{2.00}M_z(HPO_3)_y(OH)_v x(H_2O)_w \quad (VII)$$

where M represents alkali metal cations, z is 0.01 to 1.5 and y is 2.63 to 3.5 and v is 0 to 2 and w is 0 to 4;

$$Al_{2.00}(HPO_3)_u(H_2PO_3)_t x(H_2O)_s \quad (VIII)$$

where u is 2 to 2.99 and t is 2 to 0.01 and s is 0 to 4, and/or aluminum phosphite [Al(H2PO$_3$)$_3$], secondary aluminum phosphite [Al$_2$(HPO$_3$)$_3$], basic aluminum phosphite [Al(OH)(H$_2$PO$_3$)$_2$*2aq], aluminum phosphite tetrahydrate [Al$_2$(HPO$_3$)$_3$*4aq], aluminum phosphonate, Al$_7$(HPO$_3$)$_9$(OH)$_6$(1,6-hexanediamine)$_{1.5}$*12H$_2$O, Al$_2$(HPO$_3$)$^3$*xAl$_2$O$_3$*nH$_2$O where x=2.27-1 and/or Al$_4$H$_6$P$_{16}$O$_{18}$.

Preferred inorganic phosphonates (component G) are salts that are insoluble or sparingly soluble in water.

Particularly preferred inorganic phosphonates are aluminum, calcium and zinc salts.

More preferably, component G is a reaction product of phosphorous acid and an aluminum compound.

Particularly preferred components G are aluminum phosphites having CAS numbers 15099-32-8, 119103-85-4, 220689-59-8, 56287-23-1, 156024-71-4 and 71449-76-8.

The aluminum phosphites used with preference are prepared by reaction of an aluminum source with a phosphorus source and optionally a template in a solvent at 20-200° C. over a period of time of up to 4 days. For this purpose, aluminum source and phosphorus source are mixed for 1-4 h, heated under hydrothermal conditions or at reflux, filtered off, washed and dried, for example at 110° C.

Preferred aluminum sources are aluminum isopropoxide, aluminum nitrate, aluminum chloride, aluminum hydroxide (e.g. pseudoboehmite).

Preferred phosphorus sources are phosphorous acid, (acidic) ammonium phosphite, alkali metal phosphites or alkaline earth metal phosphites.

Preferred alkali metal phosphites are disodium phosphite, disodium phosphite hydrate, trisodium phosphite, potassium hydrogenphosphite.

A preferred disodium phosphite hydrate is Brüggolen® H10 from Brüggemann.

Preferred templates are 1,6-hexanediamine, guanidine carbonate or ammonia.

A preferred alkaline earth metal phosphite is calcium phosphite.

The preferred ratio of aluminum to phosphorus to solvent here is 1:1:3.7 to 1:2.2:100 mol. The ratio of aluminum to template is 1:0 to 1:17 mol. The preferred pH of the reaction solution is 3 to 9. A preferred solvent is water.

In the application, particular preference is given to using the same salt of phosphinic acid as of phosphorous acid, i.e., for example, aluminum diethylphosphinate together with aluminum phosphite or zinc diethylphosphinate together with zinc phosphite.

In a preferred embodiment, the above-described flame-retardant polyamide compositions comprise, as component G, a compound of the formula (III)

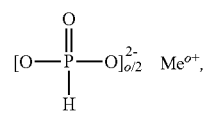

in which Me is Fe, TiO$_r$, Zn or especially Al,
o is 2 to 3, preferably 2 or 3, and
r=(4−o)/2.

Compounds of the formula (III) that are used with preference are those in which Me$^{o+}$ is $Zn^{2+}$, $Fe^{3+}$ or especially $Al^{3+}$.

Compounds of the formula (III) that are used with preference are those in which Me$^{o+}$ is $Zn^{2+}$, $Fe^{3+}$ or especially $Al^{3+}$.

Component G is preferably present in an amount of 0.005% to 10% by weight, especially in an amount of 0.02% to 5% by weight, based on the total amount of the polyamide composition.

The flame-retardant polyamide compositions of the invention have a glow wire ignition temperature (GWIT) according to IEC-60695-2-13 of not less than 775° C., preferably of not less than 800° C.

Preference is given to flame-retardant polyamide compositions of the invention that have a comparative tracking index, measured according to International Electrotechnical Commission Standard IEC-60112/3, of not less than 500 volts.

Likewise preferred flame-retardant polyamide compositions of the invention attain a V-0 assessment according to UL-94, especially measured on moldings of thickness 3.2 mm to 0.4 mm.

Further preferred flame-retardant polyamide compositions of the invention have a glow wire flammability index according to IEC-60695-2-12 of not less than 960° C., especially measured on moldings of thickness 0.75-3 mm.

The polyamide compositions of the invention comprise, as component A, one or more polyamides having a melting point of not more than 290° C. The melting point is determined by means of differential scanning calorimetry (DSC) at a heating rate of 10 K/second.

The polyamides of component A are generally homo- or copolyamides which derive from (cyclo)aliphatic dicarboxylic acids or the polyamide-forming derivatives thereof, such as salts thereof, and from (cyclo)aliphatic diamines or from (cyclo)aliphatic aminocarboxylic acids or the polyamide-forming derivatives thereof, such as salts thereof.

The polyamides used in accordance with the invention as component A are thermoplastic polyamides.

According to Hans Domininghaus in "Die Kunststoffe and ihre Eigenschaften" [The Polymers and Their Properties], 5th edition (1998), pages 14, thermoplastic polyamides are polyamides wherein the molecular chains have no side branches or else varying numbers of side branches of greater or lesser length, and which soften when heated and are virtually infinitely shapable.

The polyamides used in accordance with the invention as component A may be prepared by various methods and be synthesized from very different starting materials and, in the specific application case, may be modified alone or in combination with processing auxiliaries, stabilizers or else polymeric alloy partners, preferably elastomers, to give materials having specifically established combinations of properties. Also suitable are mixtures having proportions of other polymers, preferably of polyethylene, polypropylene, ABS, in which case it is optionally possible to use one or more compatibilizers. The properties of the polyamides can be improved by addition of elastomers, for example with regard to impact resistance, especially when the polyamides are glass fiber-reinforced polyamides as is the case here. The multitude of possible combinations enables a very large number of products having a wide variety of different properties.

A multitude of procedures have become known for preparation of polyamides, using different monomer units, various chain transfer agents for establishment of a desired molecular weight or else monomers having reactive groups for intended later aftertreatments according to the end product desired.

The processes of industrial relevance for preparation of polyamides usually proceed by polycondensation in the melt. This is also understood to include the hydrolytic polymerization of lactams as a polycondensation.

Polyamides for use with preference as component A are semicrystalline aliphatic polyamides which can be prepared proceeding from aliphatic diamines and aliphatic dicarboxylic acids and/or cycloaliphatic lactams having at least 5 ring members or corresponding amino acids.

Useful reactants include aliphatic dicarboxylic acids, preferably adipic acid, 2,2,4- and 2,4,4-trimethyladipic acid, azelaic acid and/or sebacic acid, aliphatic diamines, preferably tetramethylenediamine, hexamethylenediamine, nonane-1,9-diamine, 2,2,4- and 2,4,4-trimethylhexamethylenediamine, the isomeric diaminodicyclohexylmethanes, diaminodicyclohexylpropanes, bisaminomethylcyclohexane, aminocarboxylic acids, preferably aminocaproic acid, or the corresponding lactams. Copolyamides formed from two or more of the monomers mentioned are included. Particular preference is given to using caprolactams, very particular preference to using ε-caprolactam.

Preferably, the aliphatic homo- or copolyamides used in accordance with the invention are nylon-12, nylon-4, nylon-4,6, nylon-6, nylon-6,6, nylon-6,9, nylon-6,10, nylon-6,12, nylon-6,66, nylon-7,7, nylon-8,8, nylon-9,9, nylon-10,9, nylon-10,10, nylon-11 or nylon-12. These are known, for example, by the trade names Nylon®, from DuPont, Ultramid®, from BASF, Akulon® K122, from DSM, Zytel® 7301, from DuPont; Durethan® B 29, from Bayer and Grillamid®, from Ems Chemie.

Also particularly suitable are compounds based on PA 6, PA 6,6 and other aliphatic homo- or copolyamides in which there are 3 to 11 methylene groups for every polyamide group in the polymer chain.

Preference is given to using flame-retardant polyamide compositions in which one or more polyamides selected from the group consisting of PA 6, PA 6,6, PA 4,6, PA 12, PA 6,10 are used as component A.

Particular preference is given to using flame-retardant polyamide compositions in which nylon-6,6 or polymer mixtures of nylon-6,6 and nylon-6 are used as component A.

Very particular preference is given to flame-retardant polyamide compositions in which component A consists to an extent of at least 75% by weight of nylon-6,6 and to an extent of at most 25% by weight of nylon-6.

Fillers and/or preferably reinforcers are used as component B, preferably glass fibers. It is also possible to use mixtures of two or more different fillers and/or reinforcers.

Preferred fillers are mineral particulate fillers based on talc, mica, silicate, quartz, titanium dioxide, wollastonite, kaolin, amorphous silicas, nanoscale minerals, more preferably montmorillonites or nanoboehmites, magnesium carbonate, chalk, feldspar, glass beads and/or barium sulfate. Particular preference is given to mineral particulate fillers based on talc, wollastonite and/or kaolin.

Particular preference is further also given to using acicular mineral fillers. Acicular mineral fillers are understood in accordance with the invention to mean a mineral filler having highly pronounced acicular character. Preference is given to acicular wollastonites. Preferably, the mineral has a length to diameter ratio of 2:1 to 35:1, more preferably of 3:1 to 19:1, especially preferably of 4:1 to 12:1. The average particle size of the acicular mineral fillers used in accordance with the invention as component B is preferably less than 20 μm, more preferably less than 15 μm, especially preferably less than 10 μm, determined with a CILAS granulometer.

Components B used with preference in accordance with the invention are reinforcers. These may, for example, be reinforcers based on carbon fibers and/or on glass fibers.

The filler and/or reinforcer may, in a preferred embodiment, have been surface-modified, preferably with an adhesion promoter or an adhesion promoter system, more preferably a silane-based adhesion promoter system. Especially in the case of use of glass fibers, in addition to silanes, it is also possible to use polymer dispersions, film formers, branching agents and/or glass fiber processing auxiliaries.

The glass fibers used with preference in accordance with the invention as component B may be short glass fibers and/or long glass fibers. Short or long glass fibers used may be chopped fibers. Short glass fibers may also be used in the form of ground glass fibers. In addition, glass fibers may also be used in the form of continuous fibers, for example in the form of rovings, monofilament, filament yarns or threads, or glass fibers may be used in the form of textile fabrics, for example of a glass weave, a glass braid or a glass mat.

Typical fiber lengths for short glass fibers prior to incorporation into the polyamide matrix are within the range from 0.05 to 10 mm, preferably from 0.1 to 5 mm. After incorporation into the polyamide matrix, the length of the glass fibers has decreased. Typical fiber lengths for short glass fibers after incorporation into the polyamide matrix are within the range from 0.01 to 2 mm, preferably from 0.02 to 1 mm.

The diameters of the individual fibers may vary within wide ranges. Typical diameters of the individual fibers vary within the range from 5 to 20 µm.

The glass fibers may have any desired cross-sectional forms, for example round, elliptical, n-gonal or irregular cross sections. It is possible to use glass fibers having mono- or multilobal cross sections.

Glass fibers may be used in the form of continuous fibers or in the form of chopped or ground glass fibers.

The glass fibers themselves, irrespective of their cross-sectional area and length, may be selected, for example, from the group of the E glass fibers, A glass fibers, C glass fibers, D glass fibers, M glass fibers, S glass fibers, R glass fibers and/or ECR glass fibers, particular preference being given to the E glass fibers, R glass fibers, S glass fibers and ECR glass fibers. The glass fibers have preferably been provided with a size, preferably containing polyurethane as film former and aminosilane as adhesion promoter.

E glass fibers used with particular preference have the following chemical composition: $SiO_2$ 50-56%; $Al_2O_3$ 12-16%; CaO 16-25%; MgO≤6%; $B_2O_3$ 6-13%; F≤0.7%; $Na_2O$ 0.3-2%; $K_2O$ 0.2-0.5%; $Fe_2O_3$ 0.3%.

R glass fibers used with particular preference have the following chemical composition: $SiO_2$ 50-65%; $Al_2O_3$ 20-30%; CaO 6-16%; MgO 5-20%; $Na_2O$ 0.3-0.5%; $K_2O$ 0.05-0.2%; $Fe_2O_3$ 0.2-0.4%, $TiO_2$ 0.1-0.3%.

ECR glass fibers used with particular preference have the following chemical composition: $SiO_2$ 57.5-58.5%; $Al_2O_3$ 17.5-19.0%; CaO 11.5-13.0%; MgO 9.5-11.5.

The salts of diethylphosphinic acid used as component C in accordance with the invention are known flame retardants for polymeric molding compounds.

Salts of diethylphosphinic acid with proportions of the phosphinic and phosphonic salts used in accordance with the invention as components D and E are also known flame retardants. The production of this combination of substances is described, for example, in U.S. Pat. No. 7,420,007 B2.

The salts of diethylphosphinic acid of component C that are used in accordance with the invention may contain small amounts of salts of component D and of salts of component E, for example up to 10% by weight of component D, preferably 0.01% to 6% by weight, and especially 0.2% to 2.5% by weight thereof, and up to 10% by weight of component E, preferably 0.01% to 6% by weight, and especially 0.2% to 2.5% by weight thereof, based on the amount of components C, D and E.

The salts of ethylphosphonic acid used in accordance with the invention as component E are likewise known as additions to diethylphosphinates in flame retardants for polymeric molding compounds, for example from WO 2016/065971 A1.

The use of the polyphosphate derivatives of melamine having a degree of condensation of not less than 20 that are used in accordance with the invention as component F as flame retardants is also known. For instance, DE 10 2005 016 195 A1 discloses a stabilized flame retardant comprising 99% to 1% by weight of melamine polyphosphate and 1% to 99% by weight of additive with reserve alkalinity. This document also discloses that this flame retardant can be combined with a phosphinic acid and/or a phosphinic salt.

Preferred flame-retardant polyamide compositions of the invention comprise, as component F, a melamine polyphosphate having an average degree of condensation of 20 to 200, especially of 40 to 150.

In another preferred range, the average degree of condensation is 2 to 100.

Further preferred flame-retardant polyamide compositions of the invention comprise, as component F, a melamine polyphosphate having a breakdown temperature of not less than 320° C., especially of not less than 360° C. and most preferably of not less than 400° C.

Preference is given to using, as component F, melamine polyphosphates that are known from WO 2006/027340 A1 (corresponding to EP 1789475 B1) and WO 2000/002869 A1 (corresponding to EP 1095030 B1).

Preference is given to using melamine polyphosphates having an average degree of condensation between 20 and 200, especially between 40 and 150, and having a melamine content of 1.1 to 2.0 mol, especially 1.2 to 1.8 mol, per mole of phosphorus atom.

Preference is likewise given to using melamine polyphosphates having an average degree of condensation (number-average) of >20, the breakdown temperature of which is greater than 320° C., the molar ratio of 1,3,5-triazine compound to phosphorus of which is less than 1.1, especially 0.8 to 1.0, and the pH of a 10% slurry of which in water at 25° C. is 5 or higher, preferably 5.1 to 6.9.

In a further preferred embodiment, components C, D, E and F are in particulate form, where the median particle size ($d_{50}$) is 1 to 100 µm.

The flame retardant polyamide composition of the invention may optionally comprise, as component G, an inorganic phosphonate, preferably an aluminum salt of phosphonic acid. These compounds are known as an addition to diethylphosphinates in flame retardants for polymeric molding compounds.

The polyamide compositions of the invention may also comprise further additives as component H. Preferred components H in the context of the present invention are antioxidants, UV stabilizers, gamma ray stabilizers, hydrolysis stabilizers, costabilizers for antioxidants, antistats, emulsifiers, nucleating agents, plasticizers, processing auxiliaries, impact modifiers, dyes, pigments and/or further flame retardants other than components C, D, E, F and G.

These especially include phosphates, for instance melamine poly(metal phosphates). Preferred metals for this purpose are the elements of main group 2, of main group 3, of transition group 2, of transition group 4 and of transition group VIIa of the Periodic Table, and also cerium and/or lanthanum.

Melamine poly(metal phosphates) are preferably melamine poly(zinc phosphates), melamine poly(magnesium phosphates) and/or melamine poly(calcium phosphates).

Preference is given to (melamine)$_2$Mg(HPO$_4$)$_2$, (melamine)$_2$Ca(HPO$_4$)$_2$, (melamine)$_2$Zn(HPO$_4$)$_2$, (melamine)$_3$Al $(HPO_4)_3$, $(melamine)_2Mg(P_2O_7)$, $(melamine)_2Ca(P_2O_7)$, $(melamine)_2Zn(P_2O_7)$, $(melamine)_3Al(P_2O_7)_{3/2}$.

Preference is given to melamine poly(metal phosphates) that are known as hydrogenphosphato- or pyrophosphatometalates with complex anions having a tetra- or hexavalent metal atom as coordination site with bidentate hydrogenphosphate or pyrophosphate ligands.

Preference is also given to melamine-intercalated aluminum, zinc or magnesium salts of condensed phosphates, very particular preference to bismelamine zincodiphosphate and/or bismelamine aluminotriphosphate.

Preference is further given to salts of the elements of main group 2, of main group 3, of transition group 2, of transition group 4 and of transition group Villa of the Periodic Table and of cerium and/or lanthanum with anions of the oxo acids of the fifth main group (phosphates, pyrophosphates and polyphosphates).

Preference is given to aluminum phosphates, aluminum monophosphates, aluminum orthophosphates ($AlPO_4$), aluminum hydrogenphosphate ($Al_2(HPO_4)_3$) and/or aluminum dihydrogenphosphate.

Preference is also given to calcium phosphate, zinc phosphate, titanium phosphate and/or iron phosphate.

Preference is given to calcium hydrogenphosphate, calcium hydrogenphosphate dihydrate, magnesium hydrogenphosphate, titanium hydrogenphosphate (TIHC) and/or zinc hydrogenphosphate.

Preference is given to aluminum dihydrogenphosphate, magnesium dihydrogenphosphate, calcium dihydrogenphosphate, zinc dihydrogenphosphate, zinc dihydrogenphosphate dihydrate and/or aluminum dihydrogenphosphate.

Particular preference is given to calcium pyrophosphate, calcium dihydrogenpyrophosphate, magnesium pyrophosphate, zinc pyrophosphate and/or aluminum pyrophosphate.

The aforementioned phosphates and other and similar phosphates are supplied, for example, by J.M. Huber Corporation, USA, as Safire® Products; these include, for instance, the APP Type II, AMPP, MPP, MPyP, PiPyP. PPaz, Safire® 400, Safire® 600, EDAP products inter alia.

Further phosphates are, for example, those mentioned in JP-A-2004204194, DE-A-102007036465 and EP-A-3133112, which are explicitly included among the usable components I.

The further additives are known per se as additions to polyamide compositions and can be used alone or in a mixture or in the form of masterbatches.

The aforementioned components A, B, C, D, E, F and optionally G and/or H may be processed in a wide variety of different combinations to give the flame-retardant polyamide composition of the invention. For instance, it is possible, at the start or at the end of the polycondensation or in a subsequent compounding operation, to mix the components into the polyamide melt. In addition, there are processing operations in which individual components are not added until a later stage. This is practiced especially in the case of use of pigment or additive masterbatches. There is also the possibility of applying components, particularly those in pulverulent form, to the polymer pellets, which may be warm as a result of the drying operation, by drum application.

It is also possible to combine two or more of the components of the polyamide compositions of the invention by mixing before they are introduced into the polyamide matrix. It is possible here to use conventional mixing units in which the components are mixed in a suitable mixer, for example at 0 to 300° C. for 0.01 to 10 hours.

It is also possible to use two or more of the components of the polyamide compositions of the invention to produce pellets that can then be introduced into the polyamide matrix.

For this purpose, two or more components of the polyamide composition of the invention can be processed with pelletizing aids and/or binders in a suitable mixer or a dish pelletizer to give pellets.

The crude product formed at first can be dried in a suitable drier or heat-treated to further increase the grain size.

The polyamide composition of the invention or two or more components thereof may, in one embodiment, be produced by roll compaction.

The polyamide composition of the invention or two or more components thereof may, in one embodiment, be produced by subjecting the ingredients to mixing, extruding, chopping (and optionally crushing and classifying) and drying (and optionally coating).

The polyamide composition of the invention or two or more components thereof may, in one embodiment, be produced by spray granulation.

The flame-retardant polymer molding compound of the invention is preferably in pellet form, for example in the form of an extrudate or compound. The pelletized material is preferably in cylindrical form with a circular, elliptical or irregular footprint, in bead form, in cushion form, in cube form, in cuboid form or in prism form.

Typical length-to-diameter ratios of the pelletized material are 1:50 to 50:1, preferably 1:5 to 5:1.

The pelletized material preferably has a diameter of 0.5 to 15 mm, more preferably of 2 to 3 mm, and preferably a length of 0.5 to 15 mm, more preferably of 2 to 5 mm.

The invention also provides moldings produced from the above-described flame-retardant polyamide composition comprising components A, B, C, D, E and F and optionally components G and/or H.

The moldings of the invention may be in any desired shape and form. Examples of these are fibers, films or shaped bodies obtainable from the flame-retardant polyamide molding compounds of the invention by any desired shaping processes, especially by injection molding or extrusion.

The flame-retardant shaped polyamide bodies of the invention can be produced by any desired shaping methods. Examples of these are injection molding, pressing, foam injection molding, internal gas pressure injection molding, blow molding, film casting, calendering, laminating or coating at relatively high temperatures with the flame-retardant polyamide molding compound.

The moldings are preferably injection moldings or extrudates.

The flame-retardant polyamide compositions of the invention are suitable for production of fibers, films and shaped bodies, especially for applications in the electricals and electronics sector.

The invention preferably relates to the use of the flame-retardant polyamide compositions of the invention in or for plug connectors, current-bearing components in power distributors (residual current protection), printed circuit boards, potting compounds, power connectors, circuit breakers, lamp housings, LED housings, capacitor housings, coil elements and ventilators, grounding contacts, plugs, in/on printed circuit boards, housings for plugs, cables, flexible circuit boards, charging cables for mobile phones, motor covers or textile coatings.

The invention likewise preferably relates to the use of the flame-retardant polyamide compositions of the invention for production of shaped bodies in the form of components for the electrics/electronics sector, especially for parts of printed circuit boards, housings, films, wires, switches, distributors, relays, resistors, capacitors, coils, lamps, diodes, LEDs, transistors, connectors, regulators, memory elements and sensors, in the form of large-area components, especially of housing components for switchgear cabinets and in the form of components of complicated configuration with demanding geometry.

The wall thickness of the shaped bodies of the invention may typically be up to 10 mm. Particularly suitable shaped bodies are those having a wall thickness of less than 1.5 mm, more preferably a wall thickness of less than 1 mm and especially preferably a wall thickness of less than 0.5 mm.

The examples which follow elucidate the invention without restricting it.

1. Components Used

Commercial Polyamides (Component A):
nylon-6,6 (PA 6,6-GV; melting range of 255–260° C.): Ultramid® A27 (BASF) nylon-6 (melting range of 217-222° C.): Durethan® B29 (Lanxess) nylon-6T/6,6 (melting range of 310-320° C.): Vestamid® HAT plus 1000 (Evonik)

Glass Fibers (Component B):
PPG HP 3610 glass fibers, diameter 10 μm, length 4.5 mm (from PPG, NL)

Flame Retardant FM 1 (Components C, D and E):
aluminum salt of diethylphosphinic acid containing 0.9 mol % of aluminum ethylbutylphosphinate and 0.5 mol % of aluminum ethylphosphonate prepared according to example 3 of U.S. Pat. No. 7,420,007 B2

Flame Retardant FM 2 (Components C, D and E):
aluminum salt of diethylphosphinic acid containing 2.7 mol % of aluminum ethylbutylphosphinate and 0.8 mol % of aluminum ethylphosphonate prepared according to example 4 of U.S. Pat. No. 7,420,007 B2

Flame Retardant FM 3 (Components C, D and E):
aluminum salt of diethylphosphinic acid containing 0.5 mol % of aluminum ethylbutylphosphinate and 0.05 mol % of aluminum ethylphosphonate prepared by the process according to U.S. Pat. No. 7,420,007 B2

Flame Retardant FM 4 (Components C, D and E):
aluminum salt of diethylphosphinic acid containing 10 mol % of aluminum ethylbutylphosphinate and 5 mol % of aluminum ethylphosphonate prepared by the process according to U.S. Pat. No. 7,420,007 B2

Flame Retardant FM 5 (Component C):
aluminum salt of diethylphosphinic acid prepared in analogy to example 1 of DE 19607635 A1

Flame Retardant FM 6 (Components C and E):
aluminum salt of diethylphosphinic acid containing 8.8 mol % of aluminum ethylphosphonate Flame Retardant FM 7 (Component G):
aluminum salt of phosphonic acid prepared according to example 1 of DE 102011120218 A1

Flame Retardant FM 8 (Component F):
melamine polyphosphate prepared according to the example of WO 2000/002869 A1

Flame Retardant FM 9 (Noninventive):
melamine polyphosphate having an average degree of condensation of 18, prepared in analogy to WO 2000/002869 A1

2. Production, Processing and Testing of Flame-Retardant Polyamide Molding Compounds The flame retardant components were mixed together in the ratios specified in the tables and incorporated via the side intake of a twin-screw extruder (Leistritz ZSE 27/44D) into PA 6,6 at temperatures of 260 to 310° C. or into PA 6 at 250 to 275° C. or PA 6T/6,6 at 310 to 330° C. The glass fibers were added via a second side intake. The homogenized polymer strand was drawn off, cooled in a water bath and then pelletized.

After sufficient drying, the molding compounds were processed to test specimens on an injection molding machine (Arburg 320 C Allrounder) at melt temperatures of 250 to 320° C., and tested and classified for flame retardancy using the UL 94 test (Underwriter Laboratories). As well as the classification, the afterflame time was also reported.

The comparative tracking index of the moldings was determined according to International Electrotechnical Commission Standard IEC-60112/3.

The glow wire flammability index (GWIT index) was determined according to standard IEC-60695-2-12.

The glow wire ignition temperature (GWIT) was determined according to standard IEC 60695-2-13.

In the GWFI test, using 3 test specimens (for example using plates of geometry 60×60×1.5 mm), with the aid of a glow wire, at temperatures between 550 and 960° C., the maximum temperature at which an afterflame time of 30 seconds is not exceeded and the sample does not give off burning drops is determined. In the GWIT test, in a comparable measurement procedure, the glow wire ignition temperature 25 K higher (30 K higher between 900° C. and 960° C.) than the maximum glow wire temperature that does not lead to ignition in 3 successive tests even during the contact time of the glow wire is reported. Ignition is regarded here as a flame having a burning time of 5 sec.

All tests in the respective series, unless stated otherwise, were performed under identical conditions (such as temperature programs, screw geometry and injection molding parameters) for comparability.

EXAMPLES 1-5, 1a, 1b, 5a AND COMPARATIVE EXAMPLES C1-C5 WITH PA 6,6

The results of the experiments with PA 6,6 molding compounds are listed in the examples adduced in the table which follows. All amounts are reported as % by weight and are based on the polyamide molding compound including the flame retardants and reinforcers.

TABLE 1

PA 6,6 GF 30 Test results

| | Example No. | | | | | | | | | | | | |
|---|---|---|---|---|---|---|---|---|---|---|---|---|---|
| | 1 | 2 | 3 | 4 | 5 | 1a | 1b | 5a | C1 | C2 | C3 | C4 | C5 |
| A: Nylon-6,6 | 53 | 53 | 53 | 53 | 53 | 53 | 50 | 50 | 53 | 53 | 58 | 53 | 53 |
| B: HP3610 glass fibers | 30 | 30 | 30 | 30 | 30 | 30 | 30 | 30 | 30 | 30 | 30 | 30 | 30 |
| C + D + E: FM 1 | 12 | — | — | — | — | 8 | 16 | — | — | — | — | — | — |

TABLE 1-continued

PA 6,6 GF 30 Test results

| | Example No. | | | | | | | | | | | | |
|---|---|---|---|---|---|---|---|---|---|---|---|---|---|
| | 1 | 2 | 3 | 4 | 5 | 1a | 1b | 5a | C1 | C2 | C3 | C4 | C5 |
| C + D + E: FM 2 | — | 12 | — | — | 10 | — | — | 10 | — | 12 | 12 | 17 | — |
| C + D + E: FM 3 | — | — | 12 | — | — | — | — | — | — | — | — | — | — |
| C + D + E: FM 4 | — | — | — | 12 | — | — | — | — | — | — | — | — | — |
| C: FM 5 | — | — | — | — | — | — | — | — | — | — | — | — | 12 |
| C + E: FM 6 | — | — | — | — | — | — | — | — | 12 | — | — | — | — |
| G: FM 7 | — | — | — | — | 0.02 | — | — | 5 | — | — | — | — | — |
| F: FM 8 | 5 | 5 | 5 | 5 | 5 | 9 | 4 | 5 | 5 | — | — | — | 5 |
| Comparison: FM 9 | — | — | — | — | — | — | — | — | — | 5 | — | — | — |
| UL 94 0.4 mm/time [sec] | C-0/25 | C-0/20 | C-0/25 | C-0/40 | C-0/10 | C-0/28 | C-0/26 | C-0/10 | C-0/45 | n.d. | C-2/99 | C-1/85 | C-0/49 |
| GWIT [°C.] | 775 | 775 | 775 | 800 | 775 | 775 | 775 | 775 | 725 | n.d. | 700 | 700 | 725 |
| GWFI [°C.] | 960 | 960 | 960 | 960 | 960 | 960 | 960 | 960 | 960 | n.d. | 850 | 900 | 960 |
| CTI [volts] | 600 | 600 | 600 | 600 | 600 | 600 | 600 | 600 | 500 | n.d. | 600 | 600 | 500 |

(1-5, 1a, 1b and 5a inventive; C1-C5 comparisons; n.d. = not determined)

The inventive polyamide compositions of examples 1 to 5, 1a, 1b and 5a are molding compounds which attain the UL94 V-0 fire class at 0.4 mm, simultaneously have CTI 600 volts or 550 volts, GWFI 960° C. and GWIT 775° C. The addition of component G in examples 5 and 5a leads to another improvement in flame retardancy, expressed by a reduced afterflame time.

The omission of component D in comparative example C1 resulted not only in a prolonged afterflame time but also in a reduced CTI value compared to examples 1-4.

The replacement of component F by a component having a lower degree of condensation in comparative example C2 had the result that the polyamide strand foamed in the course of production and no measurements could be undertaken.

The omission of component F in comparative example C3 resulted not only in a deterioration of the fire protection class compared to example 2 but also in reduced GWFI and GWIT values.

In comparative example C4, an improvement in fire protection class compared to example C3 was achieved by increasing the concentration of components C, D and E. However, this polyamide composition still exhibited a lower fire protection class compared to example 2 and reduced GWFI and GWIT values.

The omission of components D and E in comparative example C5 resulted not only in a prolonged afterflame time but also in a reduced value compared to examples 1-4.

EXAMPLES 6-10 AND COMPARATIVE EXAMPLES C6-C10 WITH PA 6,6/PA 6

The results of the experiments with PA 6/PA 6,6 molding compounds are listed in the examples adduced in the table which follows. All amounts are reported as % by weight and are based on the polyamide molding compound including the flame retardants and reinforcers.

TABLE 2

PA 6/PA 6,6 GF 30 Test results

| | Example No. | | | | | | | | | |
|---|---|---|---|---|---|---|---|---|---|---|
| | 6 | 7 | 8 | 9 | 10 | C6 | C7 | C8 | C9 | C10 |
| A: Nylon-6,6 | 38 | 38 | 38 | 38 | 38 | 38 | 38 | 43 | 38 | 38 |
| A: Nylon 6 | 15 | 15 | 15 | 15 | 15 | 15 | 15 | 15 | 15 | 15 |
| B: HP3610 glass fibers | 30 | 30 | 30 | 30 | 30 | 30 | 30 | 30 | 30 | 30 |
| C + D + E: FM 1 | 12 | — | — | — | — | — | — | — | — | — |
| C + D + E: FM 2 | — | 12 | — | — | 10 | — | 12 | 12 | 17 | — |
| C + D + E: FM 3 | — | — | 12 | — | — | — | — | — | — | — |
| C + D + E: FM 4 | — | — | — | 12 | — | — | — | — | — | — |
| C: FM 5 | — | — | — | — | — | — | — | — | — | 12 |
| C + E: FM 6 | — | — | — | — | — | 12 | — | — | — | — |
| H: FM 7 | — | — | — | — | 2 | — | — | — | — | — |
| F: FM 8 | 5 | 5 | 5 | 5 | 5 | 5 | — | — | — | 5 |
| Comparison: FM 9 | — | — | — | — | — | — | 5 | — | — | — |
| UL 94 0.4 mm/time [sec] | C-0/29 | C-0/23 | C-0/44 | C-0/28 | C-0/14 | C-0/47 | n.d. | C-2/99 | C-1/87 | C-0/49 |
| GWIT [°C.] | 775 | 775 | 775 | 775 | 800 | 725 | n.d. | 675 | 700 | 725 |
| GWFI [°C.] | 960 | 960 | 960 | 960 | 960 | 960 | n.d. | 850 | 900 | 960 |
| CTI [volts] | 600 | 600 | 600 | 600 | 600 | 500 | n.d. | 600 | 600 | 500 |

(6-10 inventive; C6-C10 comparisons; n.d. = not determined)

The inventive polyamide compositions of examples 6 to 10 are molding compounds which attain the UL94 V-0 fire class at 0.4 mm, simultaneously have CTI 600 volts or 550 volts, GWFI 960° C. and GWIT 775° C. The addition of component G in example 10 leads to another improvement in flame retardancy, expressed by a reduced afterflame time.

The omission of component D in comparative example C6 resulted not only in a prolonged afterflame time but also in a reduced CTI value compared to examples 6-9.

The replacement of component F by a component having a lower degree of condensation in comparative example C7 had the result that the polyamide strand foamed in the course of production and no measurements could be undertaken.

The omission of component F in comparative example C8 resulted not only in a deterioration of the fire protection class compared to example 7 but also in reduced GWFI and GWIT values.

In comparative example C9, an improvement in fire protection class compared to example C8 was achieved by increasing the concentration of components C, D and E. However, this polyamide composition still exhibited a lower fire protection class compared to example 7 and reduced GWFI and GWIT values.

The omission of components D and E in comparative example 010 resulted not only in a prolonged afterflame time but also in a reduced CTI value compared to examples 6-9.

COMPARATIVE EXAMPLES C11-C16 WITH PA 6T/6,6

The results of the experiments with PA 6T/6,6 molding compounds are listed in the examples adduced in the table which follows. All amounts are reported as % by weight and are based on the polyamide molding compound including the flame retardants and reinforcers.

TABLE 3

PA 6T/6,6 GF 30 test results

| | Example No. | | | | | |
|---|---|---|---|---|---|---|
| | C11 | C12 | C13 | C14 | C15 | C16 |
| A: Nylon-6T/6,6 | 52.8 | 52.8 | 52.8 | 52.8 | 52.8 | 52.8 |
| B: HP3610 glass fibers | 30 | 30 | 30 | 30 | 30 | 30 |
| C + D + E: FM 1 | 12 | — | — | — | — | — |
| C + D + E: FM 2 | — | 12 | — | — | 10 | — |
| C + D + E: FM 3 | — | — | 12 | — | — | — |
| C + D + E: FM 4 | — | — | — | 12 | — | — |
| C: FM 5 | — | — | — | — | — | 12 |
| C + E: FM 6 | — | — | — | — | — | — |
| I: FM 7 | — | — | — | — | 2 | — |
| F: FM 8 | 5 | 5 | 5 | 5 | 5 | 5 |
| Comparison: FM 9 | — | — | — | — | — | — |
| UL 94 0.4 mm/time [sec.] | n.d. | n.d. | n.d. | n.d. | n.d. | n.d. |
| GWIT [° C.] | n.d. | n.d. | n.d. | n.d. | n.d. | n.d. |
| GWIF [° C.] | n.d. | n.d. | n.d. | n.d. | n.d. | n.d. |
| CTI [volts] | n.d. | n.d. | n.d. | n.d. | n.d. | n.d. |

(n.d. = not determined)

None of the PA molding compounds from comparative examples 011-C16 produced test specimens since the PA molding compounds were found not to be workable. The polyamide strands foamed up in the course of production and it was not possible to produce any test specimens suitable for the measurements.

The invention claimed is:

1. A flame-retardant polyamide composition, comprising:

25% to 75% by weight of polyamide having a melting point of not more than 290° C. as component A, wherein the component A comprises polymer mixtures of nylon-6,6 and nylon-6;

20% to 40% by weight of fillers and/or reinforcers as component B;

5% to 10% by weight of phosphinic salt of the formula (I) as component C

in which $R_1$ and $R_2$ are ethyl,

M is Al, Fe, $TiO_p$ or Zn, m is 2 to 3, and $p=(4-m)/2$;

0.05% to 1.5% by weight of a compound selected from the group of the Al, Fe, $TiO_p$ and Zn salts of ethylbutylphosphinic acid, of dibutylphosphinic acid, of ethylhexylphosphinic acid, of butylhexylphosphinic acid and/or of dihexylphosphinic acid as component D, wherein $p=(4-m)/2$ and m is 2 to 3;

0.01% to 0.6% by weight of a phosphonic salt of the formula II as component E

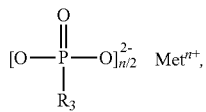

in which R₃ is ethyl,
Met is Al, Fe, TiO$_q$ or Zn,
n is 2 to 3, and $q=(4-n)/2$;

2% to 10% by weight of melamine polyphosphate having an average degree of condensation of 20 to 200 as component F; and
0.02% to 2% by weight of an inorganic phosphite phosphonate as component G,
wherein the flame-retardant polyamide composition has a glow wire ignition temperature (GWIT) according to IEC-60695-2-13 of not less than 800 °C. at thickness 0.75-3 mm.

2. The flame-retardant polyamide composition as claimed in claim 1, wherein M and Met are Al, m and n are 3, and component D is an aluminum salt.

3. The flame-retardant polyamide composition as claimed in claim 1, wherein the inorganic phosphonate as component G is a compound of the formula (III)

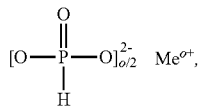

in which Me is Fe, TiO$_r$, Zn or Al,
o is 2 to 3, and $r=(4-o)/2$, where the compound of the formula III is present in an amount of 0.02% to 5% by weight, based on the total amount of the polyamide composition.

4. The flame-retardant polyamide composition as claimed in claim 1, wherein the flame-retardant polyamide composition has a comparative tracking index measured by International Electrotechnical Commission Standard IEC-60112/3 of not less than 500 volts.

5. The flame-retardant polyamide composition as claimed in claim 1, wherein the flame-retardant polyamide composition attains a V-0 assessment according to UL94 from thickness 3.2 mm to 0.4 mm.

6. The flame-retardant polyamide composition as claimed in claim 1, wherein the flame-retardant polyamide composition has a glow wire flammability according to IEC-60695-2-12 of not less than 960° C. at thickness 0.75-3 mm.

7. The flame-retardant polyamide composition as claimed in claim 1, wherein component A consists to an extent of at least 75% by weight of nylon-6,6 and to an extent of at most 25% by weight of nylon-6.

8. The flame-retardant polyamide composition as claimed in claim 1, wherein glass fibers are used as component B.

9. The flame-retardant polyamide composition as claimed in claim 1, wherein components C, D, E and F are in particulate form, where the median particle size $d_{50}$ of these components is 1 to 100 μm.

10. The flame-retardant polyamide composition as claimed in claim 1, wherein the average degree of condensation of the melamine polyphosphate is 40 to 150.

11. The flame-retardant polyamide composition as claimed in claim 1, wherein the melamine polyphosphate has a breakdown temperature of not less than 320° C.

12. The flame-retardant polyamide composition as claimed in claim 1, which comprises further additives as component H, where the further additives are selected from the group consisting of antioxidants, UV stabilizers, gamma ray stabilizers, hydrolysis stabilizers, costabilizers for antioxidants, antistats, emulsifiers, nucleating agents, plasticizers, processing auxiliaries, impact modifiers, dyes, pigments and/or further flame retardants other than components C, D, E, F and G.

13. The flame-retardant polyamide composition as claimed in claim 1 in the form of fibers, films or shaped bodies.

* * * * *